US010931480B1

(12) United States Patent
Waldersen

(10) Patent No.: US 10,931,480 B1
(45) Date of Patent: Feb. 23, 2021

(54) WIRELESS FLIGHT SENSOR SYSTEM FOR AIR AND SPACE VEHICLES

(71) Applicant: United States of America as Represented by the Administrator of NASA, Washington, DC (US)

(72) Inventor: Matthew R Waldersen, Lancaster, CA (US)

(73) Assignee: United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 204 days.

(21) Appl. No.: 16/007,024

(22) Filed: Jun. 13, 2018

Related U.S. Application Data

(60) Provisional application No. 62/519,380, filed on Jun. 14, 2017.

(51) Int. Cl.
  *H04L 12/66* (2006.01)
  *H04L 29/06* (2006.01)
  *H04L 29/08* (2006.01)
  *H04B 1/00* (2006.01)
  *H04L 7/00* (2006.01)
  *H04L 12/40* (2006.01)

(52) U.S. Cl.
  CPC ........... *H04L 12/66* (2013.01); *H04B 1/0003* (2013.01); *H04L 7/0008* (2013.01); *H04L 12/40* (2013.01); *H04L 67/12* (2013.01); *H04L 67/2809* (2013.01); *H04L 67/2823* (2013.01); *H04L 69/18* (2013.01); *H04L 2012/4028* (2013.01)

(58) Field of Classification Search
  USPC ......................................................... 709/246
  See application file for complete search history.

(56) References Cited

U.S. PATENT DOCUMENTS

| 5,531,402 A | 7/1996 | Dahl |
| 7,119,676 B1 * | 10/2006 | Silverstrim ............ G01D 21/00 340/531 |
| 7,719,416 B2 | 5/2010 | Arms et al. |
| 9,094,803 B2 | 7/2015 | Rubin et al. |

(Continued)

FOREIGN PATENT DOCUMENTS

WO  WO/2005/119609  7/2006

OTHER PUBLICATIONS

Wireless Sensor Networks for Area Monitoring and Integrated Vehicle Health Management Applications by Henry O. Marcy et al. Rockwell Science Center, AIAA-99-4557 (1999).

(Continued)

*Primary Examiner* — Hermon Asres

(57) ABSTRACT

A wireless flight sensor system that incorporates a network of wireless sensors all in communication with a sensor gateway, the gateway in turn being in communication with a flight network. The sensor gateway includes a software defined radio (SDR) by which sensors communicate. The SDR is easily reconfigurable to accommodate new wireless technology. The flight network software (FNS) comprises a modular software architecture with a management repository, a traffic manager, a wireless interface controller, and a sensor database. The resulting system is both scalable and easily reprogrammable to accommodate a wide variety of current and future wireless sensing capability.

8 Claims, 8 Drawing Sheets

(56) References Cited

U.S. PATENT DOCUMENTS

| | | | |
|---|---|---|---|
| 2005/0074122 A1* | 4/2005 | Fascenda | H04L 9/3234 |
| | | | 380/258 |
| 2009/0172117 A1 | 7/2009 | Bedi et al. | |
| 2011/0199976 A1* | 8/2011 | Mitchell | H04Q 9/00 |
| | | | 370/328 |
| 2014/0148974 A1 | 5/2014 | Cahill | |

OTHER PUBLICATIONS

Sensor Technology for Integrated Vehicle Health Management of Aerospace Vehicles by Prosser et al. NASA Langley Research Center (2002).
InfoSys White Paper (2015) by Divakaran et al.

\* cited by examiner

WIRELESS FLIGHT SENSOR SYSTEM FOR AIR AND SPACE VEHICLES

CROSS-REFERENCE TO RELATED APPLICATIONS

The present application derives priority from U.S. provisional patent application Ser. No. 62/519,380 filed on 14 Jun. 2017.

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND a. Field of Invention

The invention relates to aircraft control systems and, more particularly, to a wireless sensor system.

b. Background of the Invention

Wireless sensors are well-known, and wireless sensors, signal conditioners, processors, and wireless radio frequency (RF) links continue to become smaller, consume less power, and include higher levels of integration. As a result, these components can now be combined in networks that occupy very small footprints. Wireless sensors have more recently become an active subject of research for flight systems and show promise of providing unprecedented insight into vehicle health, maintenance, and performance. Networks of intelligent sensors are described in "Intelligent Sensor Nodes Enable a New Generation of Machinery Diagnostics and Prognostics, New Frontiers in Integrated Diagnostics and Prognostics," by F. M. Discenzo, K. A. Loparo, D. Chung, A. Twarowsk, 55th Meeting of the Society for Machinery Failure Prevention Technology, April 2001, Virginia Beach.

Despite the promise of these wireless sensors, they have yet to gain significant traction throughout the aerospace industry. This is largely because an overwhelming majority of current flight systems are not compatible with wireless sensor technology. Wireless devices are subject to spectrum compliance by the Federal Communication Commission (FCC). When used in a flight system they are also subject to spectrum compliance by the Federal Aviation Administration (FAA), and the competing requirements are complex. For example, time synchronization is a necessity for flight systems that require synchronized data sampling and use real-time systems, but many consumer wireless devices do not require time synchronization. This creates a significant technical hurdle in that any practical wireless flight sensor system must integrate specially-designed hardware and software to interface the new wireless sensor system with a pre-existing avionics system, and integrate those systems into a vehicle. There are existing avionic systems that incorporate wireless sensing capability, but they are designed to utilize dedicated hardware specific to a singular wireless sensor device. This unfortunately holds those who adopt these systems hostage to the original equipment manufacturer, leaving them unable to incorporate new emerging wireless technology without significant custom development and integration. With these issues in mind, the real challenge becomes how to develop an avionics system that:

can serve as a common wireless access point that can be reconfigured for all vehicles, wireless sensors, and use cases;

provides a layer of abstraction between wireless sensor technology and the system it interfaces with; and can immediately incorporate current and future wireless technology without hardware modification.

There have been several attempts toward these goals. Henry O. Marcy et al. described an early 1999 attempt at an IVHM system that used passive sensors, active data collection nodes and a central computer. This article explicitly suggests that the sensor nodes may require synchronization for time tagging of data and coherent signal processing. Henry O. Marcy et al., Wireless Sensor Networks for Area Monitoring and Integrated Vehicle Health Management Applications, Rockwell Science Center, AIAA-99-4557 (1999). Another early NASA attempt is detailed in Prosser et al., Sensor Technology For Integrated Vehicle Health Management Of Aerospace Vehicles, NASA Langley Research Center (2002). The NASA Langley paper describes an IVHM system that was flight tested on their ARIES Flying Lab. Multi-transducer gateway nodes were used as interfaces with an on-board miniature computer, programmable digital interface, nonvolatile solid-state memory and a wireless transceiver for communication with a command station at a fixed 433 MHz.

U.S. Pat. No. 7,719,416 to Arms et al. (MicroStrain, Inc.) issued May 18, 2010 shows an aircraft wireless structural health monitoring system with energy harvesting sensors.

United States Patent Application 20140148974 by Cahill (Goodrich) published May 29, 2014 shows an aircraft sensor system with a wired plus wireless system for monitoring and controlling the aircraft. This application was abandoned after being rejected as anticipated by the Dahl patent above.

U.S. Pat. No. 9,094,803 to Rubin et al. (All Purpose Networks) issued Jul. 28, 2015 shows a wireless network based sensor data collection, processing, storage, and distribution system utilizing publish-subscribe broker services to provide conferenced connectivity between sensor devices and communicating entities. This patent is limited in context to a cellular LTE network and is provided for general interest, but it discloses the ability to send and/or receive sensor data via broker middleware to a multiplicity of end points.

More recently, Divakaran et al. in 2015 speculated on what a wireless landing gear sensor system might look like. It would generally include:

1. A collage of wireless sensors
2. One or more Remote Data Concentrators (gateways) that aggregate all sensor data through the required interfaces;
3. A central computer for the onboard integrated health monitoring (IVHM);
4. A relational database running on possibly an NVRAM
5. A data bus local to the IVHM system; and
6. An external interface for data collection by ground systems (Wired, Wireless Serial etc.). The onboard IVHM system will interact minimally with other avionics systems, for example, to fetch complementary data and parameters for e.g., the location of the aircraft. Divakaran et al., Infosys, White Paper, Infosys Technologies Ltd. (2015).

Current instrumentation systems aren't able to incorporate wireless technology because no single wireless sensor technology is designed to meet all of the needs of flight systems. If a single flight system wanted to incorporate a multitude of wireless capability to meet these varying needs, multiple interface devices would need to be developed and integrated to communicate with the unique protocol and operational frequency of each device. Consequently, of all the foregoing prior art none is able to address the technological challenge of providing a universal interface between avionics and wireless capability. None can be used to test new networking protocols and algorithms, nor can be readily modified to accommodate future wireless sensor technology.

What is needed is a wireless flight sensor system that is completely platform agnostic, is easily reprogrammed to comply with the unique spectrum management regulations applicable to the user, able to incorporate a wide variety of current and future wireless systems without physical modification to the underlying flight system, able to incorporate a multitude of dissimilar wireless systems simultaneously, and that leverages software-defined radio capabilities.

SUMMARY OF THE INVENTION

It is, therefore, an object of the present invention to provide a wireless flight sensor system that relies on a sensor gateway to consolidate the sensor data prior to transmitting to an existing avionic systems, that is completely platform agnostic and easily reprogrammed to comply with unique spectrum management regulations and interface with a multitude of dissimilar wireless sensors simultaneously, by leveraging software-defined radio capabilities.

According to the present invention, the above-described and other objects are accomplished by providing a wireless flight sensor system for aircraft that incorporates a network of wireless sensors in communication via any one or combination of protocols and operational frequencies, with a sensor gateway. The sensor gateway incorporates a software defined radio (SDR) to communicate with the network of wireless sensors. The sensor gateway consolidates the sensor data prior to transmitting it to the flight network and thereby reduces the protocol overhead making the system more efficient. The SDR is easily reconfigurable to accommodate new sensor profiles and can be readily modified to accommodate new wireless sensors.

The software that controls the function of the gateway, known as the flight network software (FNS), is modular and comprises four sub-systems: a management repository, a traffic manager, a wireless interface controller, and a sensor database. In operation, RF transmissions are received by the sensor gateways at an RF front end and are passed to the FNS which uses a multitude of software modules. Each software module is designed to extract wireless messages of a specific wireless protocol from the raw RF transmission. The FNS communicates with aircraft systems using a publish-subscribe architecture, e.g., wireless messages are only published to pre-approved systems that have requested that information. The management repository manages all publish/subscribe accounts for each end system (subscriber). The traffic manager is responsible for routing information between the various flight network software sub-systems. The wireless interface controller is responsible for controlling the SDR. Information to be transmitted across the flight network is passed from the management repository into a transmit message buffer in order of message priority, and is then published to subscribers across the flight network.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENT

The present invention is a wireless flight sensor system that incorporates a network of wireless sensors all in communication with a sensor gateway, the gateway in turn being in communication with a flight network. The wireless sensor gateway provides an agnostic wireless interface, and runs modular software to interface the wireless devices to the wireless sensor gateway, and the sensor gateway to the flight network. This software includes a software defined radio (SDR) to communicate, which is easily reconfigurable to accommodate new wireless sensor profiles. The wireless sensor gateway also preferably but optionally employs "traffic shaping" to reduce network congestion. To this end it consolidates multiple sensor measurements into a single message prior to transmitting it to the flight network, thereby reducing overhead. This improves how the system operates in the current flight context but is not absolutely required in other applications. The sensor gateway also preferably but optionally employs a mechanism to synchronize time across all wireless sensors. Time synchronization improves how the system operates in the flight context, but is not necessarily required in other applications.

Figure 1:
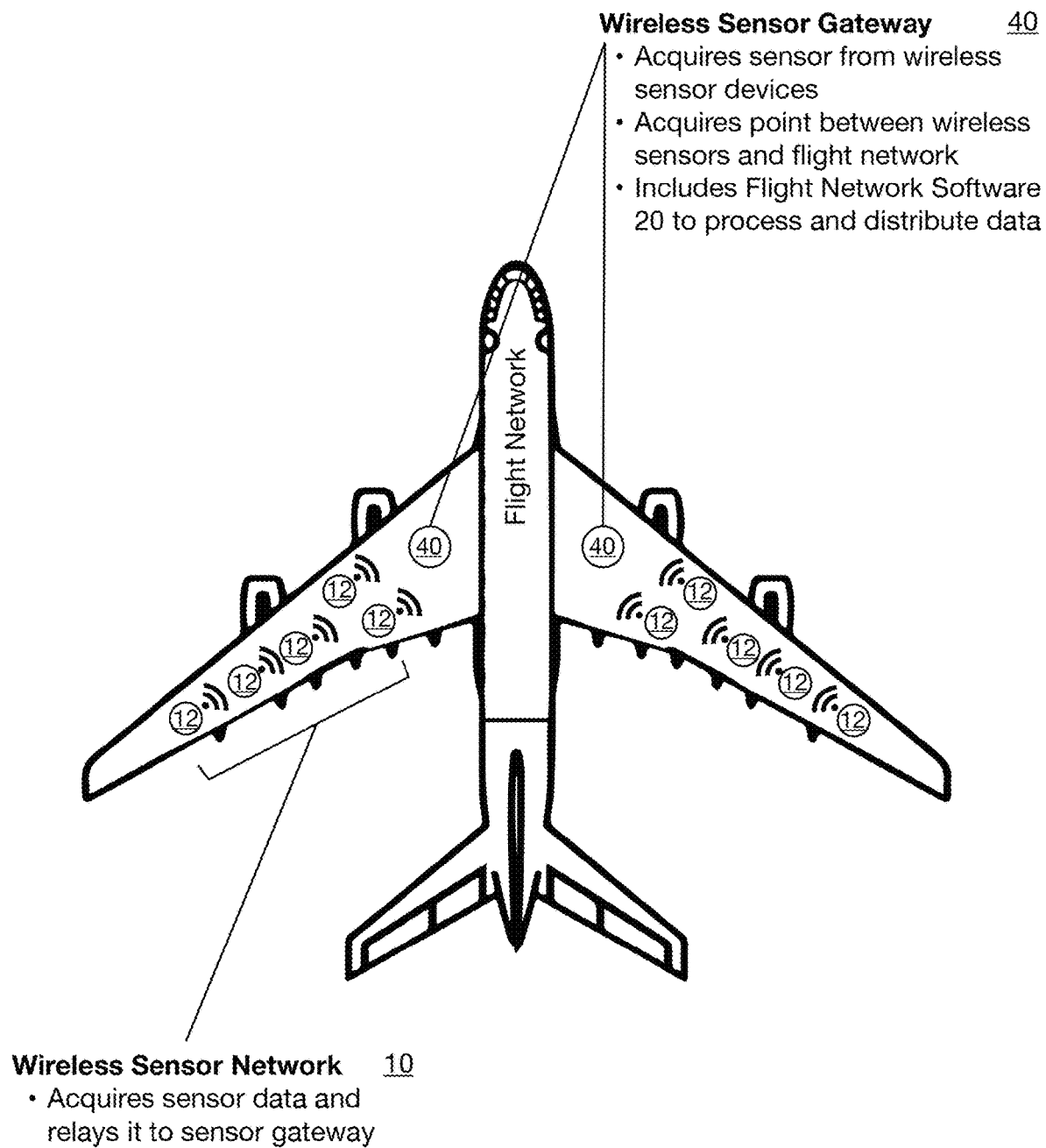
FIG. 1 is a block diagram of a wireless flight sensor system 2 according to an embodiment of the invention.

FIG. 1 is a block diagram of the wireless flight sensor system 2 according to an embodiment of the invention. The system 2 generally comprises: 1) sensor network 10 including a plurality of wireless sensors 12; 2) the wireless sensor gateway 40 (a device configured to acquire information from wireless sensors 12, and serve as an access point between wireless sensors 12 and the existing avionics; and 3) flight network software 20 running on gateway 40: a modular software architecture to process and distribute sensor 12 data.

FIG. 1 shows sensors 12 in direct communication with wireless sensor gateway 40, but one skilled in the art will recognize that there may be intermediate sensor nodes that serve as relay points between sensors 12 and the wireless sensor gateways 40. The wireless sensor gateways 40 acquire sensor data from sensors 12 (or relay nodes) and redistribute it to the existing avionics databus. More specifically, the sensor data is relayed by RF transmissions from sensors 12 (or nodes) to the wireless sensor gateways 40. The wireless sensors 12 encode the sensor data onto radio frequency (RF) transmissions. The sensor data is received by gateways 40 via a RF front end, e.g., the analog-to-digital or RF-to-baseband portion of a receiver for demodulating the previously-modulated information sent by the sensors 12. The wireless sensor gateway 40 must interface with the existing avionics via the existing avionics databus. To achieve this the gateway 40 performs several functions and runs modular flight network software (FNS) 20 responsible for the acquisition and distribution of sensor 12 data. Thus, after the gateways 40 receive the RF transmissions from sensors 12 via an RF front end 42 (to be described) which digitizes the RF transmission, the digitized transmission is passed to the FNS 20. The FNS 20 comprises four primary software modules (to be described) that work synergistically to interpret and distribute wireless messages from the raw RF transmissions. The FNS 20 preferably communicates with extrinsic aircraft systems (the existing avionics databus) preferably using a publish-subscribe architecture by which wireless messages are only published to pre-approved systems that have requested that information.

Sensor Network 10

Sensor network 10 comprises a plurality of commercially-available wireless sensors 12 all of which may be any known sensors configured for monitoring aircraft structural integrity, an engine component, an environmental control component, a power component, or any other aircraft component that requires monitoring. In prior art systems any new sensing application would dictate a need for a new wireless sensor, a suitable wireless sensor would be selected, and a new wireless avionics interface would need to be designed to meet that application. In contrast, for the present invention each sensor 12 is a generic device and one or more transceivers for communicating with the wireless sensor gateway 40.

Wireless Sensor Gateway 40

Figure 2:
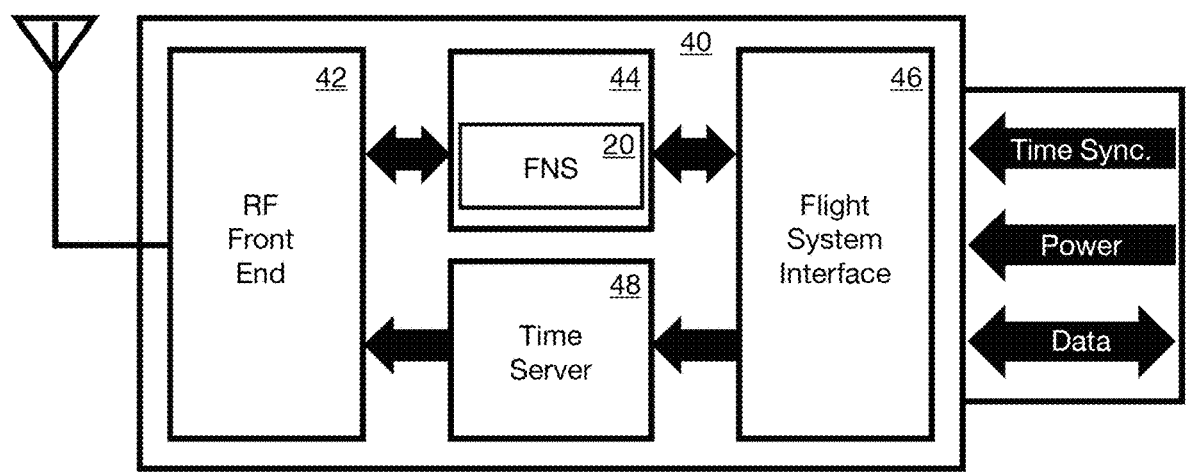
FIG. 2 is a more detailed diagram of the wireless sensor gateway 40 illustrating its sub-systems.

FIG. 2 is a more detailed diagram of the wireless sensor gateway 40 illustrating its sub-systems. The wireless sensor gateway 40 comprises four major sub-systems: 1) the RF front end 42 for wireless communication, a processor 44 hosting the FNS 20; 3) an optional time server 48; and 4) and an interface 46 to the existing avionics network that provides power, network time synchronization information (if required), and connectivity to subscriber devices on the flight network avionics databus. As stated above the FNS 20 includes four software modules: a management repository, a traffic manager, a sensor database, and a wireless interface controller that incorporates a Software Defined Radio (SDR). The Software Defined Radio (SDR) 43 (to be described) gives the wireless sensor gateway 40 the ability to accommodate and incorporate a variety of wireless sensor technologies and protocols with a single hardware interface.

The optional time server 48 is an independently-executable software module that reads the actual time from a reference clock and distributes this information to its clients using a computer network. Time server 48 may, for example, use the Network Time Protocol (NTP), Precision Time Protocol (PTP), or any other protocol in common use for sending time signals over radio links and serial connections.

At a system level, the flight network software 20 and components in communication therewith operate in a publish-subscribe architecture, e.g., it categorizes then publishes messages into classes without knowledge of which subscribers, if any, there may be. Similarly, subscribers express interest in one or more classes and only receive messages that are of interest, without knowledge of which publishers, if any, there are. This provides greater network scalability and a more dynamic network topology. In system 2 the flight network software 20 acts as a message broker, or a software module that handles the acquisition and distribution of information across the various publishers and subscribers on the avionics system.

Figure 3:
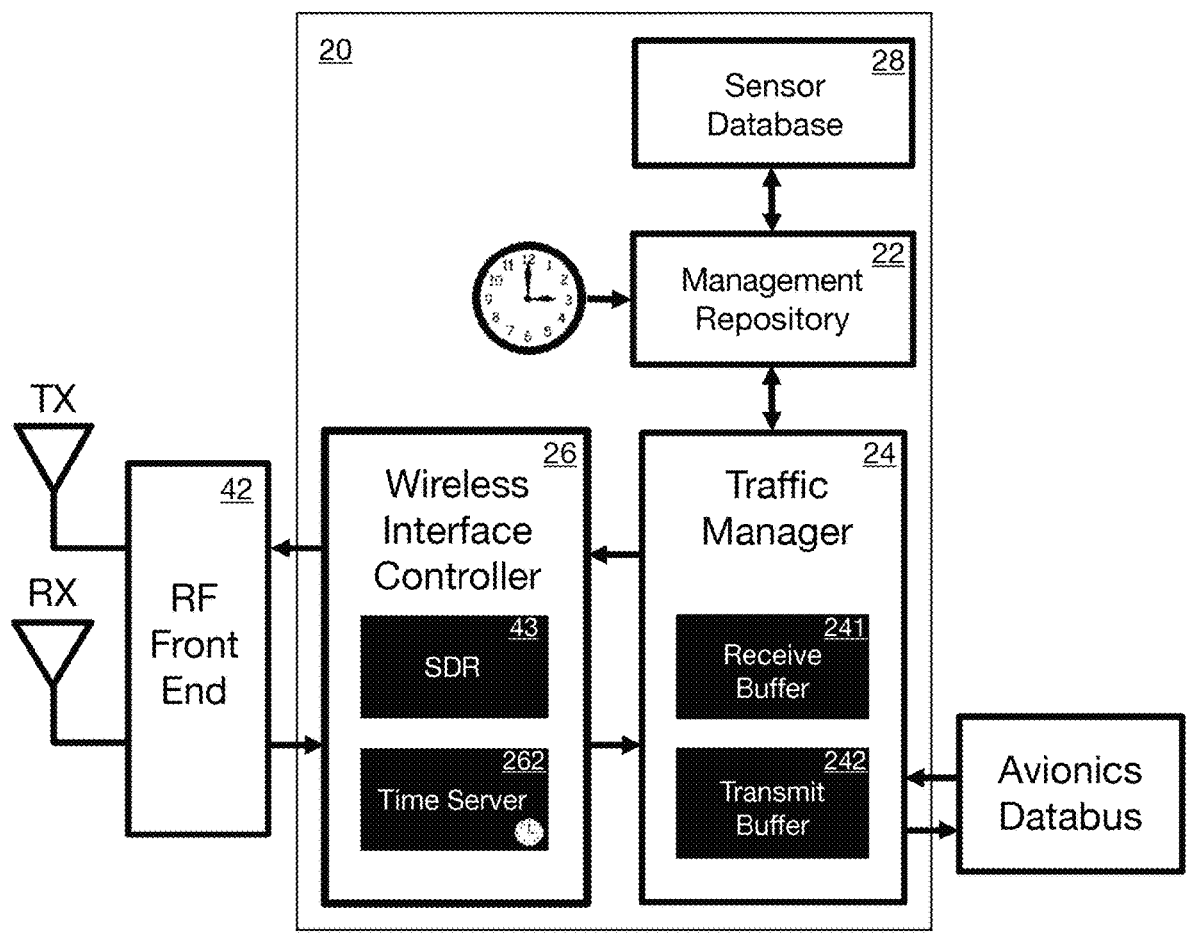
FIG. 3 is a more detailed block diagram of the flight network software 20 of FIG. 2.

FIG. 3 is a more detailed block diagram of the FNS 20 of FIG. 2 illustrating its four major modules: 1) a management repository 22; 2) the traffic manager 24; 3) the wireless interface controller 26 inclusive of software defined radio (SDR) 43; and 4) the sensor database 28.

The management repository 22 manages all publish/subscribe accounts for each sensor 12, and handles all system permissions and security.

The traffic manager 24 is responsible for routing sensor 12 data and other information received from RF front end 42 between the various flight network software 20 sub-systems, and serves as an interface between flight systems.

RF front end 42 couples with the antenna(s) and may include conventional signal filtering, detection, amplification and demodulation circuitry as needed to render an RF baseband signal that is ready for analog-to-digital conversion.

Sensor database 28 is a database of individual sensor 12 profiles.

The SDR 43 of wireless interface controller 26 is a software module for interpreting the digitized wireless transmissions received from the RF front end 42 of gateway 40 in software rather than dedicated hardware. SDR 43 can be modified to operate on wide suite of frequencies. A variety of suitable SDRs 43 have been successfully deployed in defense applications, cellular infrastructures, satellite "modems" in the commercial and defense markets, etc.

The wireless interface controller 26 is responsible for controlling the SDR 43, and more particularly routes and interprets SDR 43 signals using approved protocols. The wireless interface controller 26 may also incorporate a time server 262.

Thus, in operation raw data decoded from the RF transmissions received at front end 42 are sent to the wireless interface controller 26, where they are received and interpreted by specified SDR software modules. The SDR 43 software modules place each message in a network socket, e.g., an internal endpoint for sending or receiving data, and then to the traffic manager 24. Messages received by the traffic manager 24 are placed in a 'received message buffer' 241. The messages in the received message buffer 241 are checked in at the management repository 22 to determine if a subscriber device has requested that message be streamed to them immediately. If no authorized subscriber has requested that information be immediately streamed, it is sent to the sensor database 28 to determine if a subscriber requires that message at some point in the future. If no authorized subscriber has requested the incoming data it is ultimately discarded. On pre-specified regular time intervals the management repository 22 looks up what information is being requested at that given point in time from a subscriber account database 114 described below. Those messages are loaded from the sensor database 28 and loaded to a transmit buffer 242 of the traffic manager 24 and distributed to the applicable subscriber device.

Importantly, the frequency of data distribution may be unsatisfactory when an emergency or high-priority message is received. Thus, the management repository 22 implements a priority-override feature where if raw data decoded from the RF transmissions received at front end 42 is received at the management repository 22 and a subscriber has requested that information immediately, no consolidation occurs and the data is immediately "live-streamed." The singular data is immediately passed to the traffic manager 24 which places the priority data in a network socket and is transmitted across the flight network.

Figure 4:
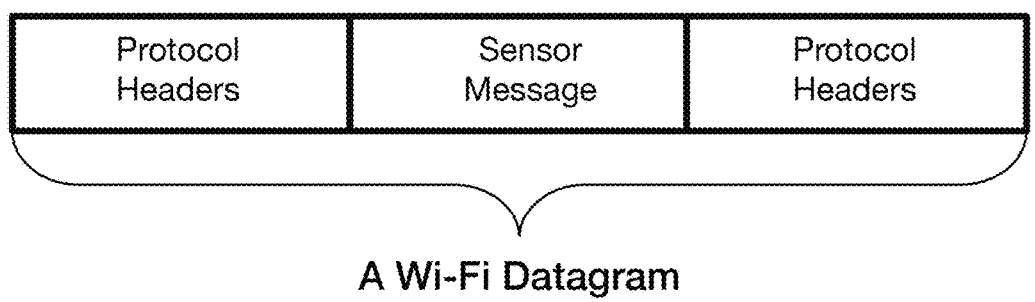
FIG. 4 is a diagram of a typical Wi-Fi datagram.
Figure 5:
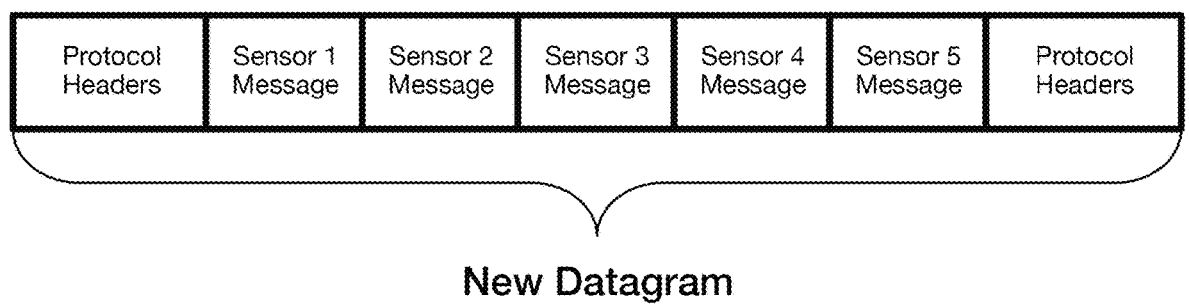
FIG. 5 is a diagram illustrating how the flight network software 20 takes the message out of each packet and reduces the net transmission overhead by consolidating them into a new message.

As indicated above, the process of loading multiple sensor messages from the sensor database 28 and placing them into a single message or transmission intended for a specific flight system application is how this system implements "Traffic Shaping." By doing so the system also decongests the flight network. For example, as seen in FIG. 4 each decoded Wi-Fi packet consists of 1) the message being sent; 2) information required for data transmission (e.g., protocol information encoded as a header and/or footer). The protocol will specify, for example, TCP/IP, or UDP/IP or otherwise. However, if the Wi-Fi header/footer is ten bits in total length, and five Wi-Fi devices are each sending one computer messages twenty bits long, there is 150 bits of network traffic. As seen in FIG. 5, the FNS 20 takes the message out of each packet and consolidates them into a new message with only one header, thereby saving 40 bits. The FNS 20 (FIG. 2) preferably communicates with extrinsic aircraft systems using a publish-subscribe architecture, e.g., wireless messages are only published to pre-approved systems that have requested that information. One skilled in the art should understand that the FNS 20 may alternatively communicate with extrinsic aircraft systems using a lookup table or other suitable architecture. The management repository 22 (FIG. 3) manages all publish/subscribe accounts for each sensor 12. If a flight network application wants to subscribe to incoming wireless messages, it sends a request to the management repository 22. The management repository authorizes this request 118. Upon authorization 112, it modifies the subscriber database 114 to include information such as a mechanism to identify the new subscriber, the data it requires, and the time frequency it requires said data. The management repository 22 also allocates memory in the sensor database 110 to ensure that incoming messages aren't discarded upon arrival. The traffic manager 24 is responsible for routing information between the various flight network software sub-systems and placing data onto the flight network. Information to be transmitted across the flight network is acquired from the sensor database 28 via the management repository 22 then places into a transmit message buffer 242, and is then published to subscribers across the existing avionics databus.

In particular, the management repository 22 includes a subscriber database 114 containing information regarding what information various avionics subsystems have subscribed to at specific points in time. The management repository 22 is responsible for managing all publish/subscribe accounts for each sensor 12 (i.e. information to publish) and flight system (i.e. systems that subscribe to sensor 12 information), modifying the sensor database 28, and verifying data to be exchanged between wireless and avionics devices.

The sensor database 28 is a conventional relational database used to consolidate sensor 12 information, maintain sensor 12 profiles for data interpretation, as a storage mechanism for post-flight analysis data, and/or as a means to ensure quality-of-service (QoS) for flight systems with highly critical data needs. Incoming messages from the wireless interface controller 26 are either stored in the sensor database 28, streamed to predefined destinations, or discarded if no subscriber is found. If a flight network application has subscribed to a given sensor message, the management repository loads the message into the transmit message buffer 242 located in the traffic manager 24. There it is placed into a specified socket which encapsulates each message into the proper protocol and format, and distributed to the subscriber located on the flight network.

Figure 6:
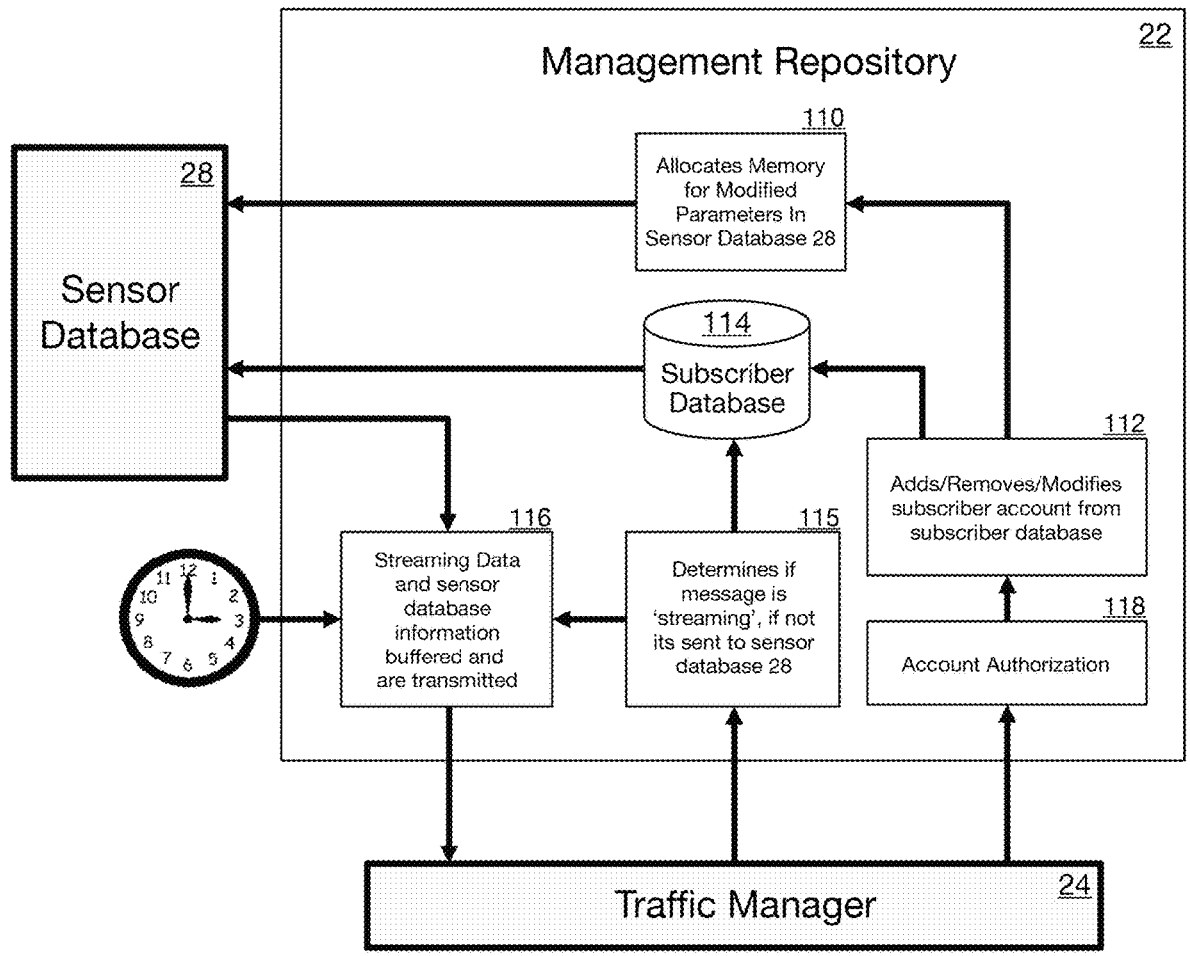
FIG. 6 is a flow diagram illustrating operation of the management repository 22 of FIG. 3.

FIG. 6 is a flow diagram illustrating operation of the management repository 22 of FIG. 3. Information is acquired from various sockets by the traffic manager 24, authenticated and processed by the management repository 22, passed to the wireless interface controller 26, and placed into a specified software-defined radio socket where the message is wirelessly transmitted. More specifically, at step 118 the management repository 22 authenticates subscribers and assuming an authentic subscriber passes information stored in the sensor database 28 to the subscribing component of the flight system. At step 112 the management repository 22 maintains a subscriber account database 114 and may add, delete or modify subscriber account data. If a subscriber account is changed, then at step 110 the management repository 22 allocates memory for the changed account in sensor database 28. Separately, the datagram (or more generally "messsage") once authenticated is buffered at step 116 for transmission by the traffic manager 24. Separately at step 115, the management repository 22 acquires the message from the traffic manager 24 and at step 115 determines if the message contains priority/emergency data being live-streamed. Transmission of priority/emergency data is prioritized as will be described. If so, then the message is loaded immediately for transmission by the traffic manager 24 without buffering.

Figure 7:
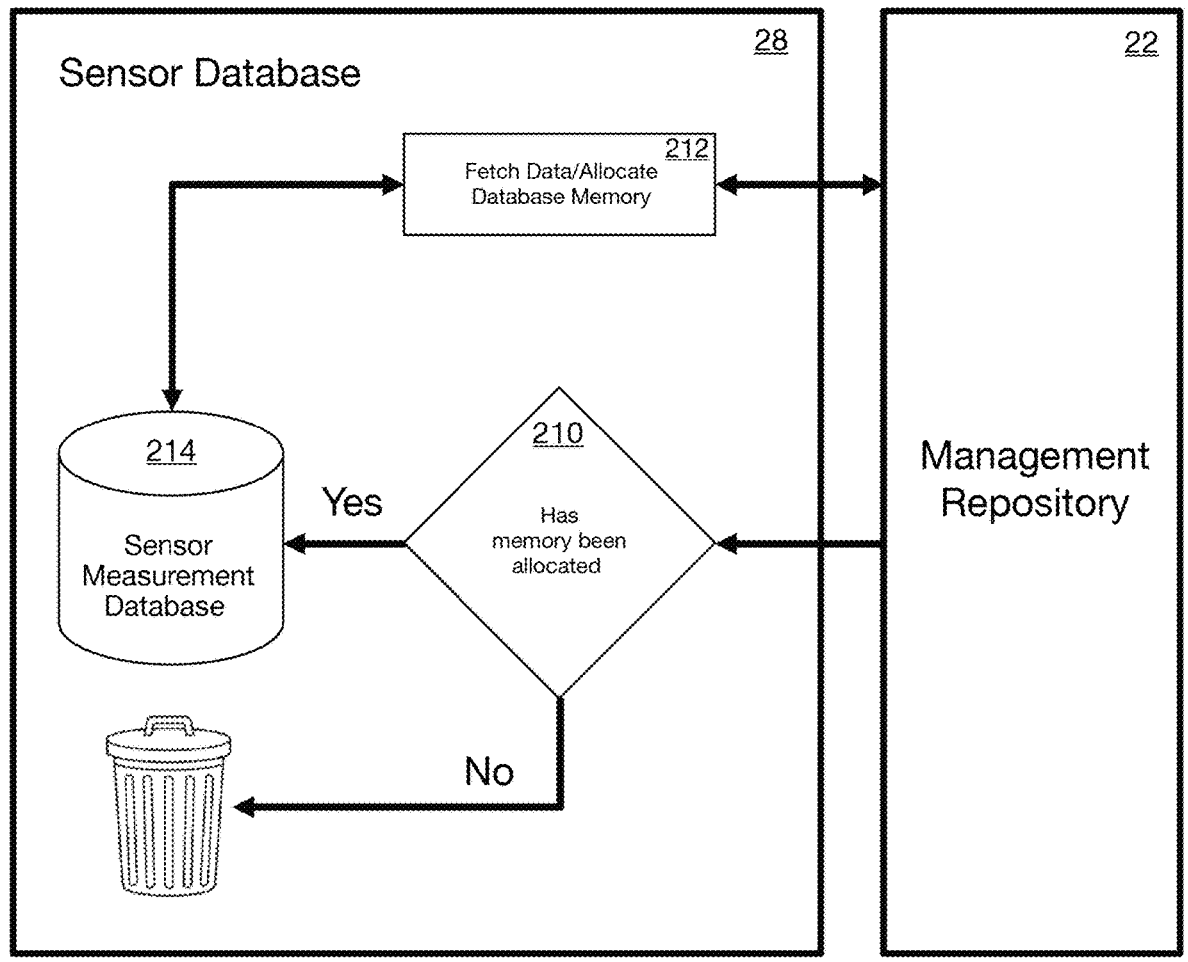
FIG. 7 is flow diagram illustrating operational flow of the sensor database 28.

FIG. 7 is flow diagram illustrating operational flow of the sensor database 28, e.g., the corollary of FIG. 6 from the perspective of the sensor database 28. The management repository 22 is the only subsystem with sufficient privileges to send modification commands to the sensor database 28 to allocate memory (step 212) for new (or modified) subscriptions, and to fetch sensor 12 measurement data. Allocating memory ensures that only required sensor 12 measurements are recorded and unnecessary ones are not. Thus at step 210 the sensor database 28 checks to ensure that memory is allocated for each subscription account and if not, simply discards the message. This is accomplished by querying a sensor measurement database at step 214. If memory for a specific measurement has been pre-allocated within the sensor measurement database 214 the information is saved and provided to the management repository 22 as required.

Figure 8:
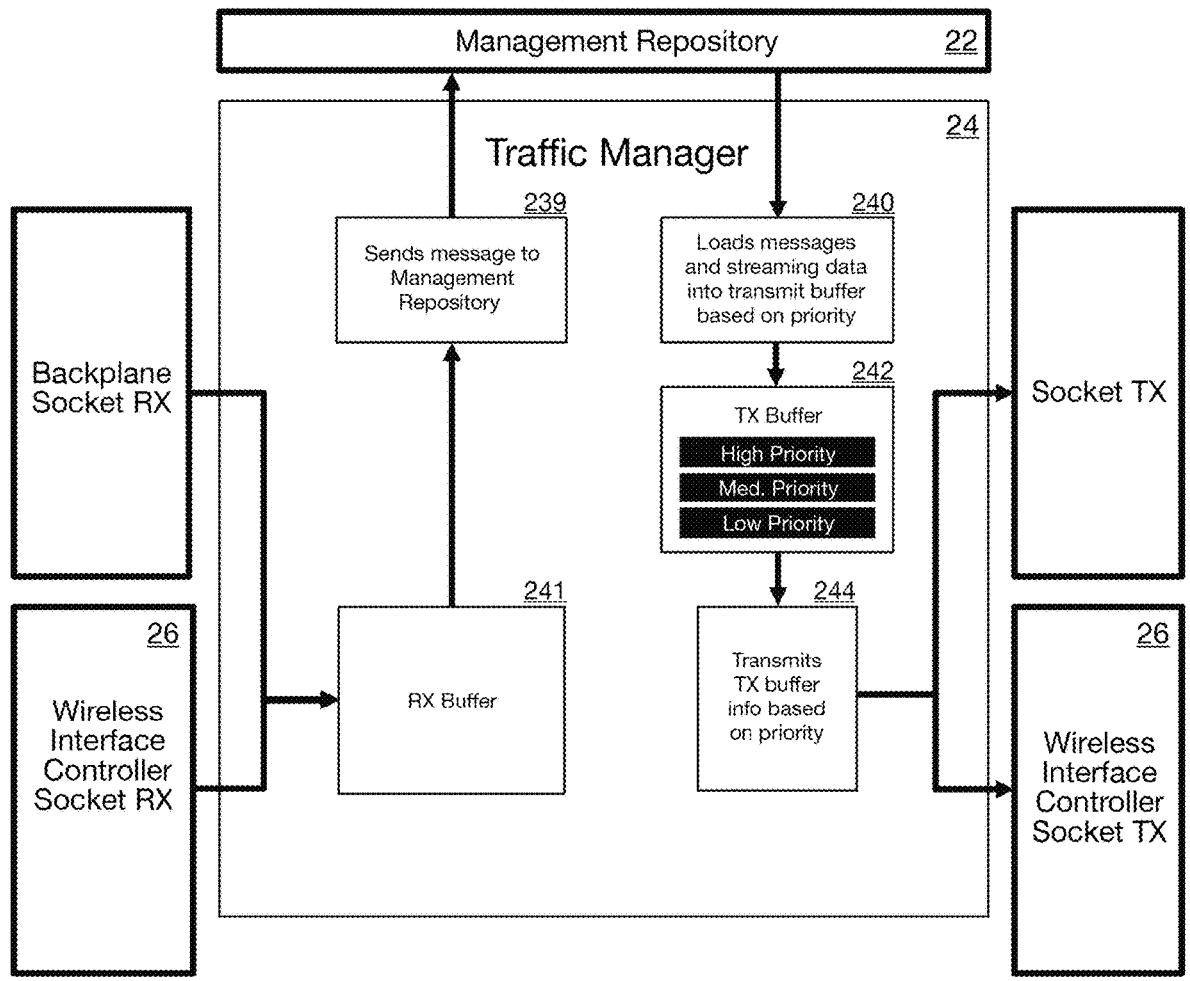
FIG. 8 is a more detailed block diagram of the traffic manager 24.

FIG. 8 is a more detailed block diagram of the Traffic Manager 24. The Traffic Manager 24 is responsible for routing information between the various FNS 20 sub-systems as seen in FIG. 3. First, incoming information is acquired from either the wireless interface controller 26 or avionics databus of FIG. 3. Each incoming message is placed into a received message buffer 241 and presented to the management repository 22 at step 239 where it is further processed. Since multiple SDR 43 modules may be receiving data simultaneously, the receive message buffer 241 is needed to consolidate messages for the management repository 22 into a single place. Information to be transmitted across the avionics databus is passed from the sensor database 28 via the management repository 22 into transmit message buffer 242 in order of priority. This step ensures that the most critical flight applications are provided data first and reduces the amount of data on the flight network avionics databus through traffic shaping. At step 244 the contents of the transmit message buffer 242 are published to its various subscribers across the flight network, in order of priority.

Figure 9:
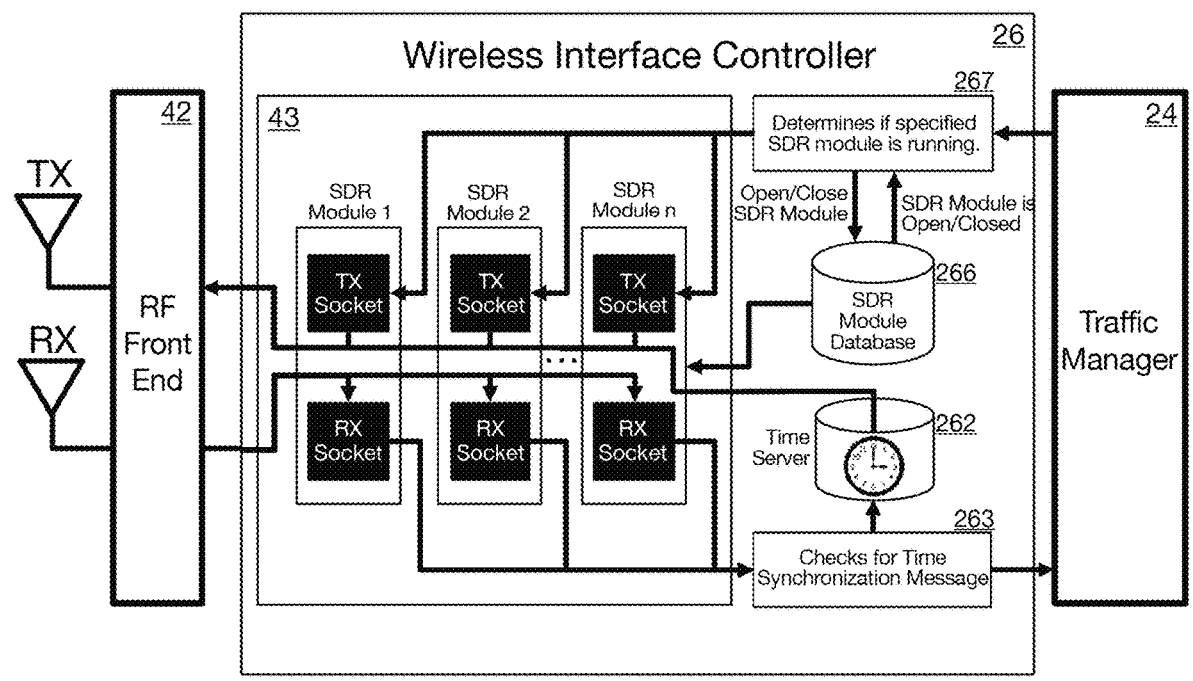
FIG. 9 is a detailed block diagram of the wireless interface controller 26.

FIG. 9 is a detailed block diagram of the Wireless Interface Controller 26. The wireless interface controller 26 is responsible for controlling the SDR 43. SDR 43 includes a plurality of SDR software modules 1 through "n" (where n refers to the number of required SDR software modules), and each SDR software module includes both a transmit (TX) socket and a receive (Rx) socket. The wireless interface controller 26 includes an SDR module database 266 that contains the software for each SDR software module and logs which SDR software modules are active or not. Incoming RF transmissions from RF front end 42 are digitized and interpreted via a specified SDR 43 software module. At step 263 the wireless interface controller checks the incoming message to see if it is a time synchronization request. If so, information from a local time server 262 is accessed and synchronization messages are immediately transmitted back to the wireless sensor 12 via SDR 43. Messages that are not requests to synchronize to the flight network time are then passed from the SDR software module Rx socket to the receive buffer 241 of the traffic manager 24. Conversely, messages originating from the flight network avionics databus that need to be distributed to a wireless device 12 are first provided to the wireless interface controller 26 by the traffic manager 24. At step 267 the wireless interface controller 26 checks the SDR module database 266 and determines if the required SDR 43 software module is currently active. If not, the required SDR 43 software module is loaded from database 266. The message is then loaded into the transmit socket Tx of the SDR 43 software module and wireless transmitted via the RF front end 42. In this system, each SDR 43 software module must first be verified to comply with the applicable spectrum management regulations.

It should now be apparent that the above-described wireless flight sensor system 2 provides spectrum compliance, is both scalable and easily reprogrammable to accommodate a wide variety of current and future wireless protocols. The system can implement time synchronization algorithms not found in available wireless technologies, is field upgradable through the addition of new SDR software modules to remain at the forefront of RF communication protocols, and is ideal for testing and developing new sensor technology.

It should be understood that various changes may be made in the form, details, arrangement and proportions of the components. Such changes do not depart from the scope of the invention which comprises the matter shown and described herein and set forth in the appended claims.

I claim:

1. A wireless system, comprising:
 a network including a plurality of wireless devices;
 a wireless gateway configured to acquire an RF signal from said wireless devices and to interpret message data therefrom, said wireless gateway further comprising,
  a radio frequency (RF) front end configured to receive and digitize said RF signal,
  a computer in communication with said RF front end, said computer comprising non-transitory storage media storing a modular array of software configured such that a new wireless interface is able to be independently integrated into said computer,
   wherein said modular array of software comprises a wireless interface controller comprising an independently-executable set of computer instructions configured as a software defined radio to interpret the digitized RF signal from the RF front end, and a time server comprising an independently-executable set of computer instructions configured to read time from a reference clock and wirelessly distribute time reference information to clients, and
 a system interface configured to interface said computer to an existing databus.

2. The wireless system according to claim 1, wherein said modular array of software further includes computer instructions configured to consolidate digitized message data from a plurality of wireless sensors into a single message.

3. The wireless system according to claim 1, wherein said modular array of software further includes a traffic manager comprising an independently-executable set of computer instructions configured to publish said message to any authorized subscriber account.

4. The wireless system according to claim 1, wherein said modular array of software further includes a management repository comprising an independently-executable set of computer instructions configured to manage authorized subscriber accounts.

5. The wireless system according to claim 1, wherein said wireless interface controller software defined radio is configured to operate a spectrum-compliant SDR module to interpret the digitized message from the RF front end.

6. The wireless system according to claim 4, wherein said management repository is configured to verify that an authorized subscriber device has requested each message.

7. The wireless system according to claim 6, wherein the message is discarded if no authorized subscriber has requested it.

8. The wireless system according to claim 7, wherein said message is loaded to the traffic manager and distributed to a requesting subscriber device if the requesting subscriber device is authorized.

* * * * *